UNITED STATES PATENT OFFICE.

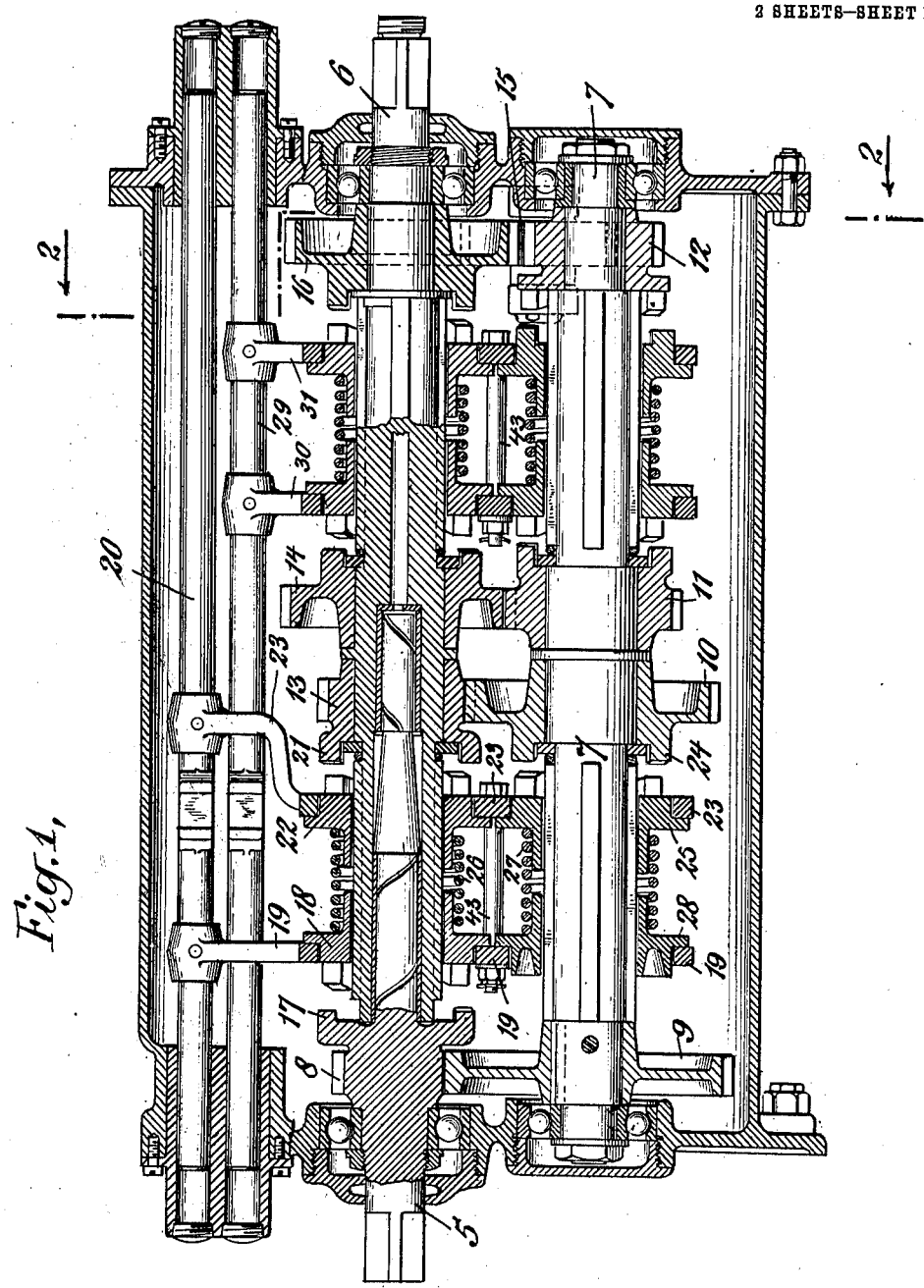

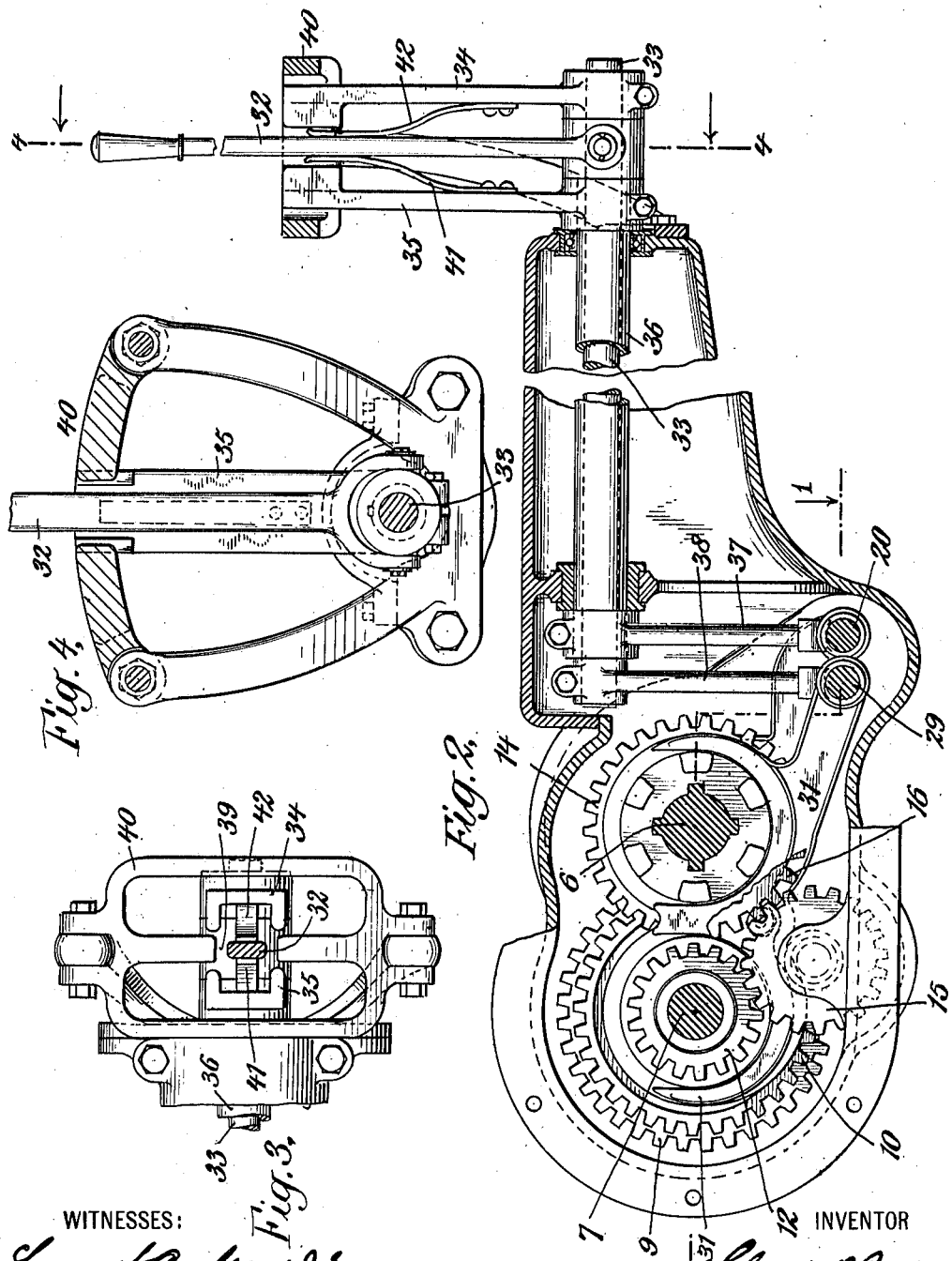

CLARK W. PARKER, OF SPRINGFIELD, MASSACHUSETTS, ASSIGNOR TO PARKER TRANSMISSION & APPLIANCE COMPANY, OF SPRINGFIELD, MASSACHUSETTS, A CORPORATION OF MASSACHUSETTS.

CLUTCH MECHANISM FOR TRANSMISSION-GEARING.

982,855.  Specification of Letters Patent.  Patented Jan. 31, 1911.

Application filed January 4, 1910. Serial No. 536,335.

*To all whom it may concern:*

Be it known that I, CLARK W. PARKER, a citizen of the United States of America, and a resident of Springfield, county of Hampden, and State of Massachusetts, have invented certain new and useful Improvements in Clutch Mechanism for Transmission-Gearing, of which the following is a specification, reference being had to the accompanying drawings, forming a part thereof.

My invention relates to improvements in transmission gearing of the type employed for transmitting driving movements at variable speeds and in different directions from the driving to the driven elements of motor vehicles and the like, and particularly to transmission gearing of this character in which heavy jaw clutches are employed for changing the speed ratio or the direction of drive; and specifically my invention consists in a novel construction and arrangement of clutch mechanism and operating means therefor wherein the movable clutch elements may yield with respect to the part carrying them, whereby the operating element may be immediately moved to a final position and the clutches permitted to complete their operative movements thereafter. This not only permits greater flexibility of operation but also provides for the movement of one clutch element in advance of the other where a plurality of clutches are simultaneously operated by the same operating element.

In order that my invention may be thoroughly understood, I will now proceed to describe an embodiment thereof, having reference to the accompanying drawings illustrating the same, and will then point out the novel features in claims.

In the drawings: Figure 1 is a view in central horizontal section through transmission gearing embodying my invention. Fig. 2 is a view in vertical transverse section therethrough, substantially upon the plane of the line 2—2 of Fig. 1. Fig. 3 is a top view of the operating means for the transmission gearing, with the hand lever in transverse section. Fig. 4 is a view in vertical longitudinal section through the operating means, substantially upon the plane of the line 4—4 of Fig. 2.

The transmission gearing as a whole comprises a driving shaft 5, a driven shaft 6, and a counter shaft 7. The driving shaft carries a driving pinion 8, the teeth of which are in mesh with the teeth of the spur gear 9 upon the counter shaft 7. Loosely mounted upon the said counter shaft are three gear wheels 10—11—12, the gear wheel 10 being arranged in mesh with a complementary gear wheel 13 loosely mounted upon the driven shaft 6, the gear wheel 11 being disposed in mesh with a complementary gear wheel 14 also loosely mounted upon the driven shaft 6, and the teeth of the gear wheel 12 being disposed in mesh with an idler gear 15 which is in turn arranged in mesh with a gear wheel 16 disposed loosely upon the driven shaft 6. The counter-shaft, it will be noted, runs constantly and the speed or direction at or in which the driven shaft will be driven will depend upon which of the gears of the sets of gears 10, 13; 11, 14; 12, 15, 16 are connected to their respective shafts, except that the highest speed in the forward direction is accomplished by directly connecting the driving and driven shaft without the employment of the intermediate gear wheels above mentioned as is common in this type of transmission gearing.

The means for connecting the driving and driven shafts together in direct driving relation comprises a jaw clutch consisting of an element 17 secured fast to the drive shaft 5, and an element 18 carried by one arm 19 of a frame secured to a shipper rod 20; the said member 18 being arranged to rotate with the driven shaft 6 but permitted a relative longitudinal or sliding movement thereon. When the shipper rod 20 is moved to the left (as viewed in Fig. 1), the clutch members 17 and 18 will be engaged, as will be well understood, and the clutch members may be as readily disengaged by merely moving them back to the normal position in which they are shown in Fig. 1 of the drawings. The means for connecting the gear wheels 13 and 10 to their shafts 6 and 7 respectively comprises a clutch composed of a member 21 secured fast to the gear wheel 13, and a member 22 mounted to rotate with the shaft 6 but permitted a longitudinal or sliding movement thereon, the said clutch member 22 being mounted in, and carried by, an arm 23 secured to the shipper rod 20,—and a clutch comprising a member 24 carried by the gear wheel 10, and a complementary member 25 secured to rotate with the shaft 7 but mounted thereon so as to move longitudinally with respect thereto, the said member 25 being also carried by the said arm 23. When the shipper rod 20 is moved to the right as is shown in Fig. 1, the clutch elements 21 and 22, and the clutch elements 24 and 25 are both engaged, thereby locking the gear wheels 13 and 10 to their respective shafts. It will be seen that as it requires the shipping rod 20 to be moved in one direction to connect the parts in high speed driving relation, and in the other direction to connect the parts in the intermediate speed driving relation, it, of course, follows that it will be impossible for a careless operator to connect one set of elements before the other is fully disengaged.

Because it is true that the two clutches 21—22, and 24—25 may not move into complete engagement at exactly the same moment, I have so mounted the clutch elements 22 and 25 as to permit them to have limited sliding movements in the arm 23 which carries them, and I have provided stiff helical springs 26—27 for forcing them forward. This permits the operator to positively move the shipping rod forward while allowing the clutch members to spring into position successively as may be necessary. I have also mounted the clutch element 18 in a similar way, the spring 26 being disposed between the two clutch elements 22, 18, and I have provided a follower 28 carried by the arm 19 for engaging the spring 27 at one end thereof whereby to constitute a resistance device to force the spring against the clutch member 25.

In addition to the shipper rod 20 I have provided a second shipper rod 29 having thereon two arms 30—31 which carry clutch elements similar to those above described, whereby by moving the shipper rod 29 to the left the wheels 14 and 11 may be secured in driving relation with their respective shafts, and by moving the shipping rod 29 to the right the gear wheels 16 and 12 may be similarly connected.

Suitable controlling means, preferably of the selective type, may be employed for operating the clutches through the medium of the shipping rods 20—29, and as a convenient means for this purpose I have shown a hand lever 32 laterally pivoted to a collar mounted loosely upon a shaft 33, an operating arm 34 mounted fast upon the said shaft, and an operating arm 35 mounted fast upon a sleeve 36. The sleeve 36 is provided with an arm 37 which engages the shipper rod 20 while the shaft 33 is provided with an arm 38 which engages the shipping rod 29. The controlling lever 32 may be deflected to the right or left against the tension of leaf springs 41—42 to cause the same to operatively engage with either of the operating arms, and thus in the subsequent forward and rearward movements thereof to operate either of the shipper rods, and through the shipper rods, the selected clutches. A guide frame 40 serves as a guide for the said lever and limits the movements thereof.

From the foregoing description of the yielding means employed in connection with the clutch mechanism it will be readily understood that a full movement forward or backward may be given immediately to the controlling lever 32 whenever an operating movement is imparted thereto, because should the jaws of the clutches fail to come together promptly the springs will yield to permit them to come together at some later time. It will also be readily understood that in an operating movement of the lever the clutch elements of a set of the clutches may operate successively so that they may come into co-engagement one at a time, instead of being compelled to co-engage simultaneously as would be the case if the yielding means were not employed It will further be seen that all of the parts of the entire structure are simple and strong. The clutch elements, being of the jaw type, constitute the strongest form of coupling means known. The sliding connection between the coupling elements and the shaft carrying them may include a plurality of keys and keyways (see Figs. 1 and 2) by which great strength is secured, and the arms 19—23 and 30—31 may be braced together by suitable bolts 43, such as will effectively lend rigidity thereto.

What I claim is:

1. In transmission gearing, the combination with a shaft and a rotatable element loosely mounted thereon, of a clutch element carried by the said rotatable element, a complementary clutch element mounted upon the said shaft to rotate therewith but arranged to slide longitudinally thereon, a carrier for the latter said clutch element with respect to which the said clutch element has limited longitudinal sliding movements, means upon the carrier for limiting the sliding movement of the said sliding clutch element with respect thereto, and a spring normally tending to force the said clutch element to the limit of its sliding movement with respect to the said carrier.

2. In transmission gearing the combination with a shaft and rotatable elements loosely mounted thereon, of clutch elements carried by the said rotatable elements, complementary clutch elements mounted upon the shaft to rotate therewith but arranged to slide longitudinally with respect to the said shaft, and facing in opposite directions, a carrier for the latter said clutch elements with respect to which the said clutch elements have limited longitudinal sliding movements toward each other, and a spring between the two said clutch elements arranged to force them apart to the limit of their movements in such direction in the said carrier.

3. In transmission gearing, the combination with a shaft and rotatable elements loosely mounted thereon, of two clutch elements carried by the said rotatable elements, the said clutch elements facing toward each other, complementary clutch elements mounted upon the said shaft between the two first said clutch elements and facing in opposite directions, the latter said clutch elements being arranged to rotate with the said shaft but to slide longitudinally thereon, a shipper rod arranged parallel to the said shaft and mounted to move longitudinally, a carrier upon the shipping rod, for the said sliding clutch elements, comprising arms engaging the said clutch elements and permitting limited longitudinal movements of the said elements with respect thereto, the said clutch elements having shouldered portions for engaging the sides of the said arms to limit their outward movements, and a helical spring between the two said clutch elements forcing them apart to the limit of their sliding movements with respect to the said carrier and resisting sliding movements thereof with respect to the said carrier in an opposite direction.

In witness whereof, I have hereunto set my hand this 22nd day of December, 1909.

CLARK W. PARKER.

Witnesses:
J. F. MALLEY,
GEORGE H. CUMMINGS.